United States Patent [19]

Sklebitz

[11] Patent Number: 4,503,460
[45] Date of Patent: Mar. 5, 1985

[54] X-RAY DIAGNOSTIC INSTALLATION COMPRISING AN IMAGE INTENSIFIER TELEVISION CHAIN

[75] Inventor: Hartmut Sklebitz, Erlangen, Fed. Rep. of Germany

[73] Assignee: Siemens Aktiengesellschaft, Berlin & Munich, Fed. Rep. of Germany

[21] Appl. No.: 426,736

[22] Filed: Sep. 29, 1982

[30] Foreign Application Priority Data

Feb. 26, 1982 [DE] Fed. Rep. of Germany ....... 3207085

[51] Int. Cl.³ .................... H04N 5/32; H04N 3/12; H04N 3/14; H04N 5/30
[52] U.S. Cl. .................................... 358/111; 358/212; 358/213; 358/209
[58] Field of Search ............... 358/111, 152, 183, 209, 358/221, 212, 213

[56] References Cited

U.S. PATENT DOCUMENTS 4,104,516  8/1978  Wang et al. .
4,142,213  2/1979  Glenn ................................. 358/221
4,365,269  12/1982 Haendle ............................. 358/111
4,393,410  7/1983  Ridge et al. ....................... 358/293
4,400,734  8/1983  Davy .................................. 358/163
4,442,537  4/1984  Haendle ............................. 358/111

Primary Examiner—Howard W. Britton
Assistant Examiner—John K. Peng
Attorney, Agent, or Firm—Hill, Van Santen, Steadman & Simpson

[57] ABSTRACT

An exemplary embodiment includes an X-ray image intensifier, an optic coupling device, a television pickup device with an optoelectronic solid state image converter, and a monitor, wherein the solid state image converter is constructed from n semiconductor image sensors each of which is formed of a matrix of sensor elements. The optic coupling device exhibits n lenses, and the lenses are so arranged that various regions of the outlet fluorescent screen of the X-ray image intensifier are imaged on the respective image sensors, so that the entire outlet fluorescent screen is scanned.

2 Claims, 1 Drawing Figure

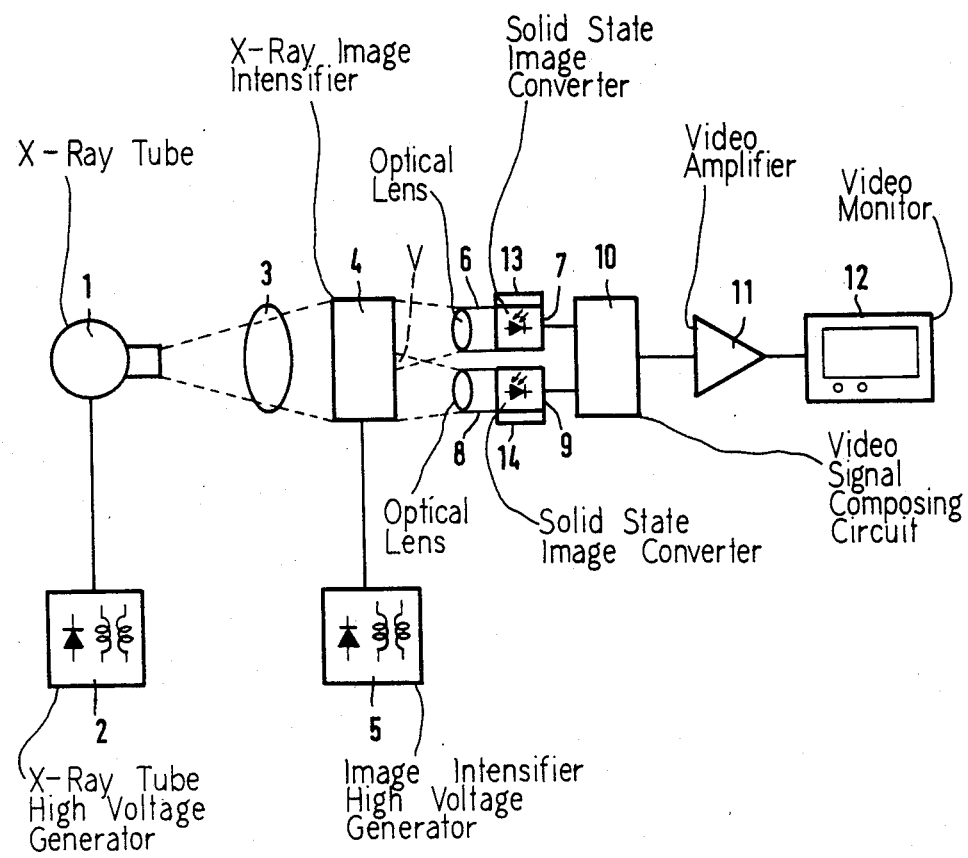

X-RAY DIAGNOSTIC INSTALLATION COMPRISING AN IMAGE INTENSIFIER TELEVISION CHAIN

BACKGROUND OF THE INVENTION

The invention relates to an X-ray diagnostic installation, comprising an image intensifier television chain which exhibits an X-ray image intensifier, an optical coupling device, a television pickup device with an optoelectronic solid state image converter, and a monitor.

In German Pat. No. 30 26 359 (corresponding to U.S. Pat. No. 4,365,269 issued Dec. 21, 1982 from an application filed June 12, 1981), an X-ray diagnostic installation of this type is described wherein the output image of the X-ray image intensifier is reproduced via an optical coupling device on a charge-coupled (CCD)-image converter. The CCD-image converter converts the incident optical image into video signals which are represented on a monitor. Since the CCD-image converters exhibit only a restricted number of sensor elements, the electron image in the X-ray image intensifier is deflected, so that the sensor elements successively scan image points which are displaced from one another. The effective number of image points is thereby increased. Through the utilization of deflection devices secured to the X-ray image intensifier the circuit-technical outlay is considerably increased. Also, the resolution cannot be randomly increased hereby. Furthermore, high demands are made of the deflection device and the X-ray image intensifier regarding freedom from distortion.

SUMMARY OF THE INVENTION

The invention proceeds from the objective of producing an X-ray diagnostic installation of the type initially cited wherein, pursuant to utilization of conventional optoelectronic solid state image converters, the number of scanned image points increases substantially and wherein the circuit-technical outlay is kept low.

In accordance with the invention, the object is achieved in that the solid state image converter is constructed from n semiconductor image sensors each of which consists of one matrix of sensor elements, respectively, that the optic coupling device exhibits n lenses, whereby the lenses are so arranged that various regions from the output fluorescent screen of the X-ray image intensifier are imaged on the image sensors, so that the entire output fluorescent screen is scanned. Through the utilization of several image sensors the number of sensor elements correspondingly increases, so that this device can also be employed in high-resolution television installations.

Errors occurring in the image sensors can be eliminated if the lenses are so arranged that the regions imaged on the sensors at least partially overlap one another. A problem-free arrangement of the recording devices can be achieved if the X-ray image intensifier consists of a flat image intensifier. A correction of the video signals is achieved if a circuit is provided which eliminates the error locations contained in the image sensors. The dark current of the solid state image converters can be reduced if cooling elements are applied to the image sensors.

The invention shall be explained in greater detail in the following on the basis of an exemplary embodiment illustrated on the accompanying drawing sheet; and other objects, features and advantages will be apparent from this detailed disclosure and from the appended claims.

BRIEF DESCRIPTION OF THE DRAWING

The single FIGURE is a diagrammatic illustration of an X-ray diagnostic installation in accordance with the present invention.

DETAILED DESCRIPTION

In the FIGURE, an X-ray diagnostic installation comprising an X-ray tube 1 is illustrated which is operated by an X-ray generator 2. The irradiation beam emanating from the X-ray tube 1 passes through a patient 3 and forms an X-ray image on the inlet fluorescent screen of a flat image intensifier 4 which is connected with a high voltage generator 5. With an optic coupling device, which consists of several lenses 6, 8, the output image of the flat image intensifier 4 is transmitted to semiconductor image sensors 7, 9, which, for example, can comprise a matrix of photodiodes or CCD-image converters as sensor elements. The outputs of the image sensors 7, 9, are supplied to a circuit 10 which assembles the output signals of the image sensors into a video signal and recognizes thus-occurring error locations of the image sensors and eliminates the errors. In a following video amplifier 11 the video signals are amplified and are then displayed on a monitor 12. Secured to the image sensors 7, 9 are cooling elements 13, 14, for example Peltier elements.

Through the utilization of a flat image intensifier 4, which is described, for example, in U.S. Pat. No. 4,104,516, one obtains an image on an outlet fluorescent screen which corresponds in its size to the incident X-ray image. This image on the outlet fluorescent screen is scanned, for example, by four lenses such as 6 and 8, the latter being arranged, respectively, in two rows with two lenses 6, 8, each. The entire area of the outlet fluorescent screen is distributed by the lenses over four image sensors of which sensors 7 and 9 are illustrated in the FIGURE.

Since the conventional image sensors have an image aspect ratio of approximately 3:4 at their photosensitive layer, whereas, in X-ray technology, the circular shape predominates, the image sensors of respective pairs are expediently horizontally aligned with reference to their longitudinal axes. This results in a vertical region such as indicated at V in the center of the image in which region the image sensors of each pair such as 7, 9 receive overlapping optical images.

In the circuit 10, connected with the output of the image sensors such as 7, 9, an image reconstruction is carried out. The output signals of the image converters are assembled into a video signal. Moreover, error locations are eliminated in that, during the manufacture of the X-ray diagnostic installation, the error locations of the image sensors such as 7, 9 are determined. In the overlapping regions then only the intact sensor element is actuated and read out. Since, in most instances, the output fluorescent screen of the image intensifier is round, but the image converters exhibit a rectangular shape, error locations can be permitted outside a circular region, since the latter region does not contribute to the image reconstruction. If, by contrast, error locations occur in the remaining region, the latter can be replaced by means of averaging of the image amplitudes of the surroundings of the error location. A circuit of this type is described in the Germman patent application No. P 31 39 331.4, so that it is not necessary to discuss this in further detail.

Instead of the four image sensors formed into pairs of horizontally aligned image sensors such as 7, 9, also larger numbers can find utilization. Thus, for example, six image sensors can be arranged in horizontally aligned pairs with columns formed by three vertically aligned image sensors for scanning an optical image supplied by a flat image intensifier. The single FIGURE illustrates this alternative also.

Since the sensor elements in part exhibit varying sensitivities, a compensation can be carried out through the circuit 10 if, for example, a record without a patient is stored in one image memory and if this record is subtracted from a record with a patient. This is likewise described in the above-captioned patent application.

In order to furthher reduce the dark current, Peltier elements 13, 14 can be secured to each of the image sensors 7, 9, which Peltier elements effect a cooling of the image sensor. The dark current is thereby considerably reduced. For example, it is reduced by half with a cooling-off per 7 K., (per seven degrees Kelvin). This improved signal-to-noise ratio can be employed for the purpose of greater amplitude resolution and for the purpose of reduction of the illumination on the image sensor so that the flat image intensifier need be designed only in a one-stage fashion and the resolution is furthermore thereby increased.

It will be apparent that many modifications and variations may be made without departing from the scope of the teachings and concepts of the present invention.

I claim as my invention:

1. An X-ray diagnostic installation comprising an image intensifier television chain which includes an X-ray image intensifier having an output fluorescent screen, an optical coupling means, a video pickup device comprising optoelectronic solid state image converter means, and a monitor, the solid state image converter means being comprised of n semiconductor image sensors each of which comprises a matrix of sensor elements, the optical coupling means comprising n lenses aligned with the image intensifier so that respective regions of the output fluorescent screen of the X-ray image intensifier are imaged on the respective image sensors, and so that the entire output fluorescent screen is scanned, and a composing circuit connected between the image sensors and the monitor and composing the output signals of the image sensors into a video signal which is displayed on the monitor.

2. An X-ray diagnostic installation according to claim 1, characterized in that the lenses are so aligned that the regions of the fluorescent screen imaged on the image sensors at least partially overlap, and that the composing circuit is furthermore so designed that error locations contained in the image sensors caused by defective sensor elements are eliminated in the overlapping region by virtue of the fact that only the non-defective sensor elements are activated.

* * * * *